Patented Aug. 16, 1927.

1,639,585

UNITED STATES PATENT OFFICE.

CARL BOSCH, OF LUDWIGSHAFEN-ON-THE-RHINE, GERMANY, ASSIGNOR, BY MESNE ASSIGNMENTS, TO I. G. FARBENINDUSTRIE AKTIENGESELLSCHAFT, OF FRANKFORT-ON-THE-MAIN, GERMANY, A CORPORATION OF GERMANY.

MANUFACTURE OF FERTILIZERS.

No Drawing. Application filed July 9, 1920, Serial No. 395,147, and in Germany July 29, 1916.

As is known, ammonium nitrate, though most valuable owing to its high and favorable nitrogen contents cannot be directly sold and handled as a fertilizer having in view that it is highly deliquescent and explosive and cannot, for this latter property, be stored in considerable quantities.

I have now found that I can overcome the said injurious properties by mixing with the ammonium nitrate alkali-metal salts other than nitrates in about equivalent quantities, or with the alkali-metal salts in an excess. For instance, chlorids of potassium or sodium can be admixed, but I prefer to employ potassium salts and thus to increase the fertilizing value of the mixture. In the first rank the cheap chlorids, or sulfates, may be used either in a pure state or as raw salts, but other salts, e. g. phosphates, may also be admixed. The composition may be prepared either by mixing the dry salts or by bringing the salts together in the presence of a limited quantity of water. In the latter case, the moisture adhering to the filtered ammonium nitrate will be sufficient to enable double decomposition of the salts into e. g. potassium nitrate-ammonium chlorid to take place and it may even offer advantages to dry the potassium salt before its being mixed with the moist ammonium nitrate so as to get at once a mixed fertilizer of sufficient dryness. In either case an entirely stable, non-explosive and non-deliquescent fertilizer is produced which can be stored even in the largest quantities.

In order to further illustrate the nature of the invention claimed and how it may be carried into effect the following example is given, but the invention is not limited thereto. The parts are by weight:

Example.

A crude potassium salt, containing 64,3 per cent of potassium chlorid, 24,6 per cent of sodium chlorid, 4,4 per cent of magnesium chlorid, 1,7 per cent of magnesium sulfate, 4,2 per cent of moisture, 0,6 per cent of potassium sulfate, 0,2 per cent of insoluble matter, is dried and mixed or ground together with centrifugally treated ammonium nitrate containing about from 2,5 to 3 per cent moisture, in the proportion of 3 parts of the former with 2 parts of the latter salt. The compound fertilizer produced contains about 14 per cent total N and 24 per cent potash ($K_2O$) and can be used for fertilizing purposes without any further drying operation. It can be stored in any required quantity and if the transformation into potassium nitrate-ammonium chlorid has not been completed during the mixing operation it will continue during storage. Potassium sulfate, or salts containing potassium sulfate, may be employed in a similar manner. Or the mixing operation may also be carried out in the absence of moisture with the dry salts. The products thus obtained are also distinguished by the absence of explosive and of deliquescent properties. Although the double decomposition mentioned cannot, in this case, take place presently, the small quantities of water condensing, from a moist atmosphere, on the surface of the ammonium nitrate, partially will dissolve the latter, thus enabling a reaction to take place with the solid alkali-metal salt leading to non-deliquescent salts.

As a further instance I mention a mixture of 100 pounds of ammonium nitrate (centrifugally treated salt containing 3 per cent of moisture) with 78 pounds of finely ground common salt of about 95 per cent NaCl. To the mixtures, prepared as aforesaid, other salts, such as ammonium, or mono calcium, or bicalcium, or tricalcium, phosphates (preferably precipitated), as well as other admixtures, such as peat, may be added.

I claim:

1. As a new composition of matter, a compound fertilizer comprising the elements of ammonium, potassium, and the anions of nitric and hydrochloric acid in about equivalent proportions.

2. The process of producing a compound, non-explosive and non-deliquescent, fertilizer consisting in mixing together ammonium nitrate and an alkali-metal salt other than a nitrate.

3. The process of producing a compound, non-explosive and non-deliquescent, fertilizer consisting in mixing together ammonium nitrate and an alkali-metal salt other than a nitrate in about equivalent proportions in the presence of water.

4. The process of producing a compound, non-explosive and non-deliquescent, fertilizer consisting in mixing together moist ammonium nitrate with a dry alkali-metal salt, other than a nitrate.

5. The process of producing a compound, non-explosive and non-deliquescent, fertilizer consisting in mixing together ammonium nitrate and an alkali-metal chlorid in about equivalent proportions.

6. The process of producing a compound, non-explosive and non-deliquescent, fertilizer consisting in mixing together moist ammonium nitrate and potassium chlorid in about equivalent proportions.

7. The process of producing a compound, non-deliquescent fertilizer consisting in mixing together ammonium nitrate and an alkali metal chloride in about equivalent proportions in the presence of water.

8. The process of producing a compound, non-deliquescent fertilizer consisting in mixing together ammonium nitrate and potassium chloride in about equivalent proportions in the presence of water.

9. As a fertilizer, a mixed salt corresponding substantially to the formula $KNO_3$—$NH_4Cl$.

10. The process of producing a compound, non-deliquescent fertilizer consisting in mixing together ammonium nitrate and an alkali metal salt of a mineral acid other than nitric acid in about equivalent proportions and in the presence of a small amount of water as does not interfere with the production of a comparatively dry product.

11. The process of producing a compound, non-deliquescent fertilizer consisting in mixing together ammonium nitrate and an alkali metal chlorid in about equivalent proportions and in the presence of a small amount of water as does not interfere with the production of a comparatively dry product.

12. The process of producing a compound, non-deliquescent fertilizer consisting in mixing together ammonium nitrate and potassium chlorid in about equivalent proportions and in the presence of a small amount of water as does not interfere with the production of a comparatively dry product.

13. The process of producing a compound, non-deliquescent fertilizer consisting in mixing together ammonium nitrate and potassium chlorid in about equivalent proportions and in the presence of a limited quantity of water so as to produce a mixed salt containing less than 5 per cent of water.

In testimony whereof I have hereunto set my hand.

CARL BOSCH.